(12) United States Patent
Boshra

(10) Patent No.: US 9,348,987 B2
(45) Date of Patent: *May 24, 2016

(54) ELECTRONIC DEVICE INCLUDING FINGER-OPERATED INPUT DEVICE BASED BIOMETRIC MATCHING AND RELATED METHODS

(75) Inventor: Michael Boshra, Rockledge, FL (US)

(73) Assignee: APPLE INC., Cupertino, CA (US)

(*) Notice: Subject to any disclaimer, the term of this patent is extended or adjusted under 35 U.S.C. 154(b) by 112 days.

This patent is subject to a terminal disclaimer.

(21) Appl. No.: 13/451,280

(22) Filed: Apr. 19, 2012

(65) Prior Publication Data

US 2013/0278383 A1 Oct. 24, 2013

(51) Int. Cl.
*G05B 19/00* (2006.01)
*G06F 21/32* (2013.01)

(52) U.S. Cl.
CPC ........ *G06F 21/32* (2013.01); *G06F 2221/2139* (2013.01)

(58) Field of Classification Search
CPC ............... G06F 2221/2117; G06F 2221/2139; G06F 21/32; H04L 63/0861; G06K 9/00087; G06K 9/00926; G06K 9/00006
USPC ........................................................ 382/124
See application file for complete search history.

(56) References Cited

U.S. PATENT DOCUMENTS

| | | | |
|---|---|---|---|
| 5,229,764 A * | 7/1993 | Matchett et al. ............. 340/5.52 |
| 5,953,441 A | 9/1999 | Setlak | |
| 6,289,114 B1 | 9/2001 | Mainguet | |
| 6,927,581 B2 | 8/2005 | Gozzini | |
| 7,361,919 B2 | 4/2008 | Setlak | |
| 7,697,281 B2 | 4/2010 | Dabov et al. | |
| 7,697,729 B2 | 4/2010 | Howell et al. | |
| 7,715,593 B1 | 5/2010 | Adams et al. | |
| 7,734,068 B2 | 6/2010 | Fisher | |
| 7,822,232 B2 * | 10/2010 | Black .................. G06F 3/03545 382/116 |
| 7,965,873 B2 * | 6/2011 | Goto ............................. 382/115 |
| 8,145,916 B2 | 3/2012 | Boshra et al. | |
| 2001/0036299 A1 * | 11/2001 | Senior .................. G06F 1/1616 382/124 |
| 2005/0071635 A1 * | 3/2005 | Furuyama ..................... 713/168 |

(Continued)

FOREIGN PATENT DOCUMENTS

EP 1521161 4/2005

OTHER PUBLICATIONS

Furnell et al., "Beyond the PIN: enhancing user authentication for mobile devices", Computer Fraud and Security, vol. 2008, No. 8, Aug. 2008, pp. 12-17.

*Primary Examiner* — Firmin Backer
*Assistant Examiner* — Adnan Aziz
(74) *Attorney, Agent, or Firm* — Allen, Dyer, Doppelt, Milbrath & Gilchrist, P.A.

(57) ABSTRACT

An electronic device may include a finger-operated input device, and a finger sensor carried by the finger-operated input device to sense a user's finger. The electronic device may further include a processor to perform applications and perform at least one device function responsive to an operation of the finger-operated input device. The processor may acquire finger-matching biometric data of the user's finger responsive to each operation of the finger-operated input device. The processor may further authenticate the user based upon an authentication request from one of the applications. The authentication may be based upon a match of most recently acquired finger-matching biometric data and finger-enrollment biometric data.

17 Claims, 3 Drawing Sheets

(56) References Cited

U.S. PATENT DOCUMENTS

| | | |
|---|---|---|
| 2006/0080525 A1* | 4/2006 | Ritter et al. .................... 713/155 |
| 2007/0079369 A1* | 4/2007 | Grinstein ......................... 726/19 |
| 2007/0192591 A1* | 8/2007 | Yumoto et al. ................. 713/159 |
| 2009/0083847 A1 | 3/2009 | Fadell et al. |
| 2009/0083850 A1* | 3/2009 | Fadell et al. .................... 726/19 |
| 2009/0150993 A1 | 6/2009 | Tilley |
| 2009/0316963 A1* | 12/2009 | Boshra .......................... 382/124 |
| 2010/0082444 A1 | 4/2010 | Lin et al. |
| 2010/0321158 A1 | 12/2010 | Setlak et al. |
| 2011/0175703 A1 | 7/2011 | Benkley, III |
| 2011/0310044 A1* | 12/2011 | Higuchi ................ G06F 1/1684 345/173 |
| 2012/0051605 A1* | 3/2012 | Nagar et al. ................... 382/124 |
| 2012/0082348 A1* | 4/2012 | Fukuda et al. ................. 382/115 |
| 2012/0127179 A1* | 5/2012 | Aspelin ......................... 345/441 |
| 2013/0127592 A1* | 5/2013 | Fyke et al. .................... 340/5.53 |
| 2013/0259330 A1* | 10/2013 | Russo et al. ................... 382/124 |
| 2013/0272586 A1* | 10/2013 | Russo ........................... 382/124 |
| 2013/0298224 A1 | 11/2013 | Heilpern |

* cited by examiner

ELECTRONIC DEVICE INCLUDING FINGER-OPERATED INPUT DEVICE BASED BIOMETRIC MATCHING AND RELATED METHODS

FIELD OF THE INVENTION

The present invention relates to the field of electronics, and, more particularly, to the field of finger sensors.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A particularly advantageous approach to fingerprint sensing is disclosed in U.S. Pat. No. 5,953,441 to Setlak and assigned to the assignee of the present invention, the entire contents of which are herein incorporated by reference. The fingerprint sensor is an integrated circuit sensor that drives the user's finger with an electric field signal and senses the electric field with an array of electric field sensing pixels on the integrated circuit substrate.

U.S. Pat. No. 6,289,114 to Mainguet, which is assigned to the assignee of the present invention and is incorporated in its entirety by reference discloses a fingerprint sensor that includes a finger sensing integrated circuit (IC). The finger sensing IC includes a layer of piezoelectric or pyroelectric material placed between upper and lower electrodes to provide electric signals representative of an image of the ridges and valleys of the fingerprint.

A particularly advantageous approach to multi-biometric fingerprint sensing is disclosed in U.S. Pat. No. 7,361,919 to Setlak, which is assigned to the assignee of the present invention and is incorporated in its entirety by reference. The Setlak patent discloses a multi-biometric finger sensor sensing different biometric characteristics of a user's finger that have different matching selectivities.

A fingerprint sensor may be particularly advantageous for verification and/or authentication in an electronic device, and more particularly, a portable device, for example. Such a fingerprint sensor may be carried by the housing of a portable electronic device, for example, and may be sized to sense a fingerprint from a single-finger. For example, the AES3400 sensor from AuthenTec, Inc. of Melbourne, Fla., the assignee of the present invention, is widely used in a variety of notebooks, desktops and PC peripherals. Other fingerprint sensors, for example, the AES850, also from AuthenTec, Inc. of Melbourne, Fla., is a multi-function smart sensor that expands touch-based functionality of touchscreen and QWERTY smartphones with a reduced impact on sensor performance or durability. Thus, a fingerprint sensor may be particularly advantageous for providing more convenient access to the electronic device without a password, for example, and, more particularly, without having to type the password, which is often time consuming. A fingerprint sensor may also be particularly advantageous for starting one or more application on the electronic device.

U.S. Patent Application Publication No. 2011/0175703 to Benkley, III discloses an electronic imager using an impedance sensor grid array mounted on or about a switch. More particularly, Benkley, III discloses a switch being incorporated into a sensor assembly that allows integration of sensor operations, such as, fingerprint sensor operations. A fingerprint sensor can be used for authentication while being used together with a power switch or navigation selection switch. The authentication may be used to access the device entirely or access different levels of information.

U.S. Patent Application Publication No. 2009/0083850 to Fadell et al. discloses an embedded authentication system in an electronic device. More particularly, Fadell et al. discloses authenticating a user via a fingerprint to provide access to resources or content that was previously not available. The electronic device may allow a user to authenticate for a particular amount of time for accessing restricted resources.

SUMMARY OF THE INVENTION

In view of the foregoing background, it is therefore an object of the present invention to provide security and with convenient access.

This and other objects, features, and advantages in accordance with the present invention are provided by an electronic device may include a finger-operated input device, and a finger sensor carried by the finger-operated input device to sense a user's finger. The electronic device may further include a processor to perform a plurality of applications and perform at least one device function responsive to an operation of the finger-operated input device, for example. The processor may be to acquire finger-matching biometric data of the user's finger responsive to each of a plurality of operations of the finger-operated input device. The processor may further be to authenticate the user based upon an authentication request from one of the plurality of applications, for example. The authentication may be based upon a match of most recently acquired finger-matching biometric data and finger-enrollment biometric data. Accordingly, the electronic device advantageously provides matching of finger biometric data based upon operation of the finger-operated input device. For example, the finger-matching biometric data may be acquired while the user operates the finger-operated input device to perform a menu function or other device function, for example. In other words, the matching may be performed in the background relative to operation of other device functions.

The authentication may be based upon a match of most recently acquired finger-matching biometric data and finger-enrollment biometric data for a threshold time period after the most recent acquisition of the finger-matching biometric data, for example. The electronic device may further include a display. The processor may be to prompt, via the display, the user to again position the user's finger on the finger-operated input device after expiration of the threshold time period. The threshold time period may be less than or equal to 30 seconds, for example.

The processor may be to acquire finger-matching biometric data of a plurality of fingers. The finger-operated input device may include a pushbutton switch, for example. The processor may also be to acquire the finger-enrollment biometric data.

The electronic device may further include wireless communications circuitry coupled to the processor and to perform at least one wireless communications function. The electronic device may also include a portable housing carrying the input device, the finger sensor, and the processor.

A method aspect is directed to a method of authenticating a user of an electronic device that may include a finger-operated input device, a finger sensor carried by the finger-operated input device to sense a user's finger, and a processor coupled to the finger sensor. The method may include using the processor to perform a plurality of applications and perform at least one device function responsive to an operation of the finger-operated input device. The processor may also be used to acquire finger-matching biometric data of the user's finger responsive to each of a plurality of operations of the finger-operated input device, and authenticate the user based upon an authentication request from one of the plurality of applications. The authentication may be based upon a match of most recently acquired finger-matching biometric data and finger-enrollment biometric data.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
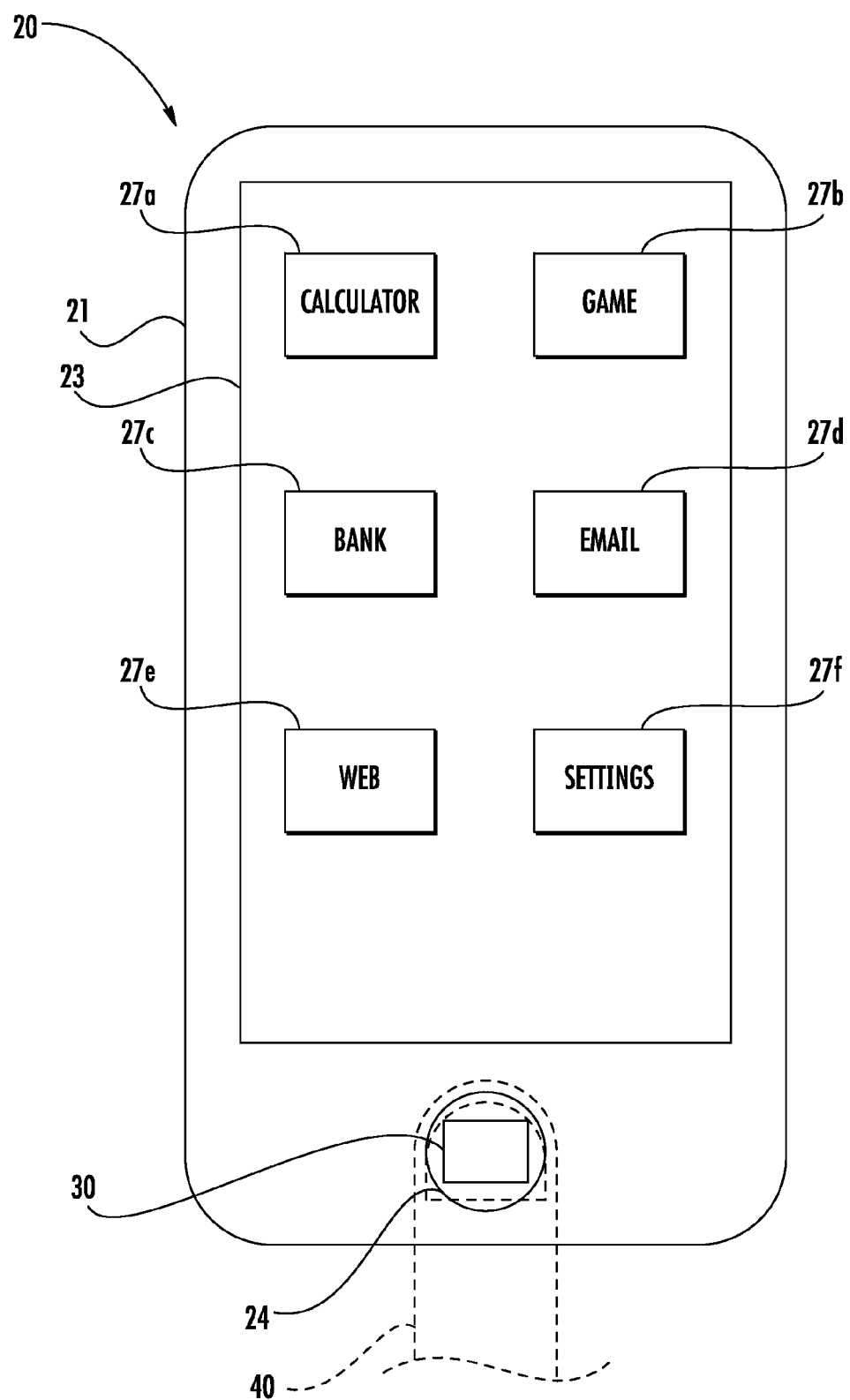
FIG. 1 is a plan view of an electronic device according to the present invention.
Figure 2:
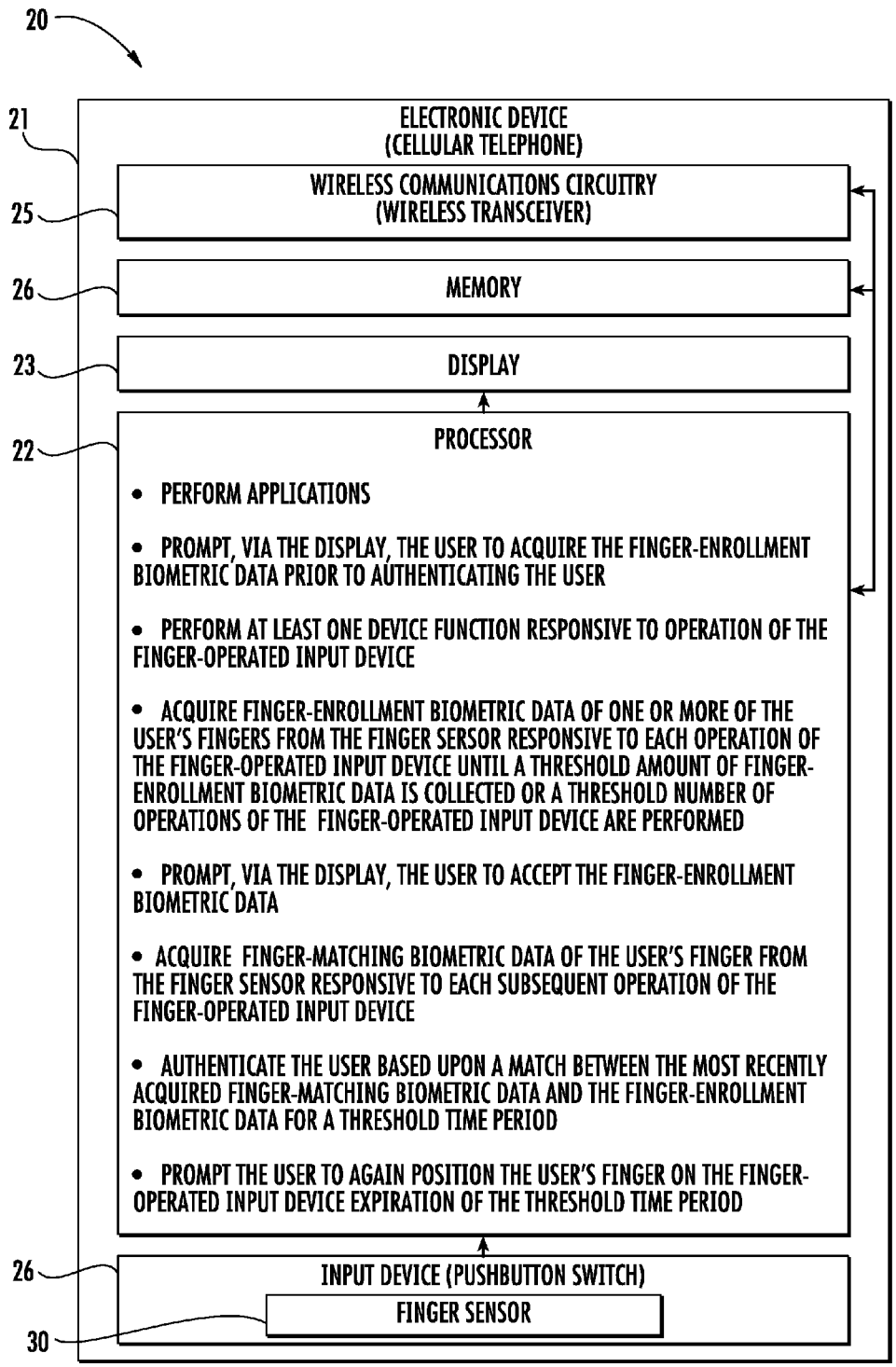
FIG. 2 is a schematic block diagram of the electronic device of FIG. 1.

Referring initially to FIGS. 1 and 2, an electronic device 20 is now described. The electronic device 20 illustratively includes a portable housing 21 and a processor 22 carried by the portable housing. The electronic device 20 is illustratively a mobile wireless communications device, for example, a cellular telephone. The electronic device 20 may be another type of electronic device, for example, a tablet computer, laptop computer, etc.

A wireless transceiver 25 is also carried within the housing 21 and coupled to the processor 22. The wireless transceiver 25 cooperates with the processor 22 to perform at least one wireless communications function, for example, for voice and/or data. In some embodiments, the electronic device 20 may not include a wireless transceiver 25 or other wireless communications circuitry.

A display 23 is also carried by the portable housing 21 and is coupled to the processor 22. The display 23 may be a liquid crystal display (LCD), for example, or may be another type of display, as will be appreciated by those skilled in the art.

The processor 22 performs a plurality of applications. More particularly, the processor may execute one or more applications based upon pressing respective display icons 27a-27f on the display 23. The icons include a web browser icon 27e, a game icon 27b, a banking application icon 27c, an email application icon 27d, a calculator application icon 27a, and a settings application icon 27f. Each application may be a third party application, for example, downloaded from a third-party, or alternatively may be an application native to the electronic device 20, for example, pre-loaded by the manufacturer.

A finger-operated input device 24, illustratively in the form of a pushbutton switch, is also carried by the portable housing 21 and is coupled to the processor 22. The pushbutton switch 24 cooperates with the processor 22 to perform a device function in response to the pushbutton switch. For example, a device function may include a powering on or off of the electronic device 20, initiating communication via the wireless communications circuitry 25, and/or performing a menu function.

More particularly, with respect to a menu function, the processor 22 may change the display 23 to show a menu of available applications based upon pressing of the pushbutton switch 24. In other words, the pushbutton switch 24 may be a home switch or button, or key. The processor 22 may also toggle between applications based upon pressing of the pushbutton switch 24. Of course, other device functions may be performed based upon the pushbutton switch 24. In some embodiments, the finger-operated input device 24 may be a different type of finger-operated input device, for example, forming part of a touch screen display. Other or additional finger-operated input devices may be carried by the portable housing 21.

A finger sensor 30 is carried by the pushbutton switch 24 to sense a user's finger 40. The finger sensor 30 is carried by the pushbutton switch 24 so that when a user contacts and/or presses downward on the pushbutton switch, finger biometric data from the user's finger 40 is acquired, for example, for finger matching and/or finger enrollment to be stored and later used for matching.

The finger biometric data may include fingerprint minutae data, ridge and/or valley fingerprint image data, ridge flow data, finger pore data, etc. For example, the finger sensor 30 may be a finger sensor as described in U.S. Pat. No. 5,953,441 to Setlak and/or as described in U.S. Pat. No. 6,927,581 to Gozzini, and assigned to the assignee of the present invention and the entire contents of which are herein incorporated by reference.

Figure 3:
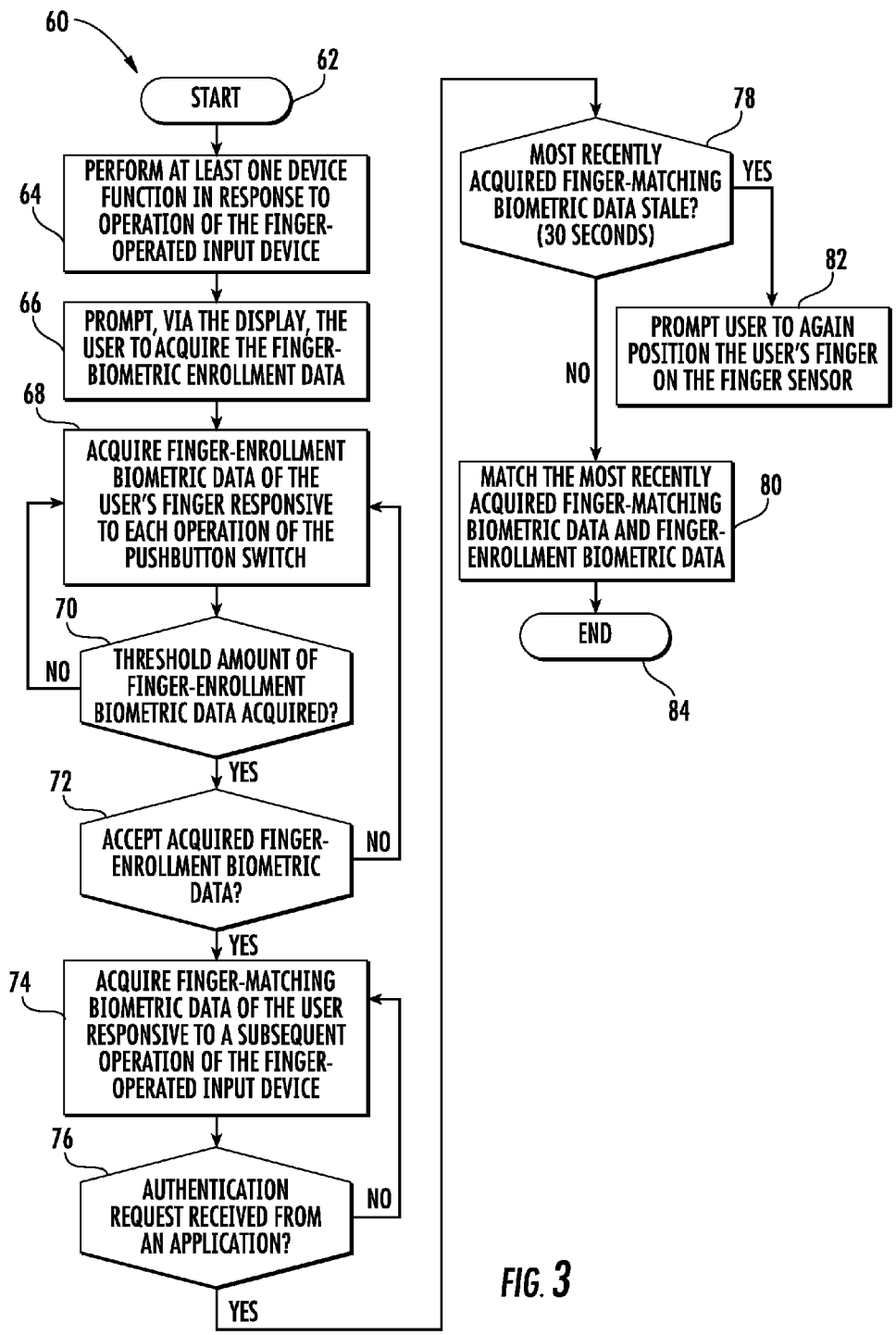
FIG. 3 is a flow chart of a method of enrolling and authenticating a user according to the present invention.

Referring now additionally to the flowchart 60 in FIG. 3, further details of operation of the electronic device 20 are now described. Beginning at Block 62, the processor 22 cooperates with the pushbutton switch 24 to perform a device function in response to the pushbutton switch (Block 64). The processor 22 acquires finger-enrollment biometric data of the user's finger from the finger sensor 30 responsive to each of the operations of the pushbutton switch 24 (Block 68). In other words, each time the user presses the pushbutton switch 24, the processor acquires finger-enrollment biometric data and stores it in a memory 26. From the perspective of the user, the acquisition of the finger-enrollment biometric data may be transparent. In particular, the finger-enrollment biometric data may be acquired during normal operation of the pushbutton switch 24 while performing device functions. Of course, finger-enrollment biometric data may be acquired from more than one finger.

In some embodiments, the processor 22 may prompt the user, via the display 23, to acquire the finger-enrollment biometric data (Block 66). More particularly, the processor 22 may prompt the user to start enrollment of finger-enrollment data. This may occur, for example, upon an initial setup of the electronic device 20. In some embodiments, the processor 22 may acquire additional finger-enrollment biometric data based upon input from the user or based upon a prompt, for example, if the user wishes to enroll finger-enrollment biometric data associated with another finger, or add finger-enrollment biometric data of another authorized user's finger. As will be appreciated by those skilled in the art, the processor 22 may perform various enrollment and matching techniques, for example. If for example, the user does not wish to acquire finger-enrollment biometric data based upon the prompt, operations of the electronic device 20 or pushbutton switch 24 may continue without acquiring any finger-enrollment biometric data.

The processor 22 acquires finger-enrollment biometric data until a threshold amount of finger-enrollment biometric data has been acquired and stored in the memory 26 (Block 70). For example, the threshold amount of finger-enrollment biometric data may correspond to a desired amount of finger-enrollment data. The threshold amount of finger-enrollment biometric data may be higher where increased placement flexibility and/or increased security is desired.

In some embodiments, the processor 22 may alternatively or additionally acquire finger-enrollment biometric data for a threshold number of operations of the pushbutton switch 24. In other words, the processor 22 may continue to acquire finger-enrollment biometric data up to a threshold number of operations of the pushbutton switch 24. The threshold number of operations may be based upon a desired level of security and/or a matching technique that may be used with the finger-enrollment biometric data, for example, as will be appreciated by those skilled in the art.

After the acquisition of the finger-enrollment biometric data, the processor 22 may prompt the user to accept the finger-enrollment biometric data (Block 72). For example, the processor 22 may indicate to the user, via the display 23, that the acquisition of the finger-enrollment biometric data has been completed. The user may accept the acquired finger-enrollment biometric data or choose to re-acquire the finger-enrollment biometric data (Block 68). In some embodiments, the processor 22 may prompt the user to accept the finger-enrollment biometric data for each finger when more than one of the user's fingers are being enrolled. This may be particularly advantageous when finger-enrollment biometric data is being acquired for more than one finger.

Upon acceptance of acquired finger-enrollment biometric data, the processor 22 acquires finger-matching biometric data of the user's finger 40 from the finger sensor 30 responsive to a subsequent operation of the pushbutton switch 24 (Block 74). For example, the processor 22 may acquire finger-matching biometric data from the user's finger 40 from the finger sensor 30 when the user presses the pushbutton switch 24 to exit an application and return to a main menu. In some embodiments, once the processor 22 has determined that enough finger-enrollment biometric data has been acquired and stored in the memory 26, the processor may start to acquire the finger-matching biometric data, for example, by an application requesting authentication. In other words, the transition from acquiring finger-enrollment biometric data to acquiring finger-matching biometric data may be transparent to the user. The processor 22 continues to acquire finger-matching biometric data based upon each operation of the pushbutton switch 24 after the finger-enrollment biometric data has been collected, or after enrollment has been completed.

The processor 22 authenticates the user based upon an authentication request from an application (Block 76). For example, after operating the pushbutton switch 24 to navigate to the main menu (FIG. 1), the user opens the banking application, which may request authentication of the user. The processor 22 authenticates the user based upon the most recently acquired finger-matching biometric data and the stored finger-enrollment biometric data stored in memory 26 for a threshold time period, for example, less than or equal to thirty seconds (Block 78). In other words, the if the most recently acquired finger-matching biometric data is not stale, or not older than thirty seconds since acquisition, the processor 22 authenticates the user by matching this most recently acquired finger-matching biometric data and the finger-enrollment biometric data (Block 80). Of course, there may be other threshold time periods. The processor 22 may authenticate the user in a similar fashion so long as any subsequent authentication request from the same or another application is received prior to expiration of the threshold time period.

By way of example, before the threshold time period has expired, the processor 22 uses the most recently acquired finger-matching biometric data to perform the matching operation. If, in the example of the banking application, which may communicate with a remote bank computer, for example, suppose the banking application has been started less than thirty seconds after using the pushbutton switch 24 to perform a menu operation, and thus a finger-matching biometric data acquisition. The banking application typically requests authentication via the finger sensor 30 to log in or perform some other application function, for example, transfer money.

However, instead of prompting the user, via the display 23, for example, to again position the user's finger 40 on the finger sensor 30, the processor 22 performs the authentication based upon the most recently acquired finger-matching biometric data (Block 80). If there is a match, the user is logged into the banking application. As will be appreciated by those skilled in the art, the processor 22 may perform various matching techniques, for example. Additionally, in some embodiments, the finger-enrollment biometric data may be updated based upon the match or, more particularly, updated with the acquired finger-matching biometric data used for the match.

In some embodiments, based upon the authentication of the user, the processor 22 may start a given or another application, or may perform additional operations with respect to the given application, for example, similar to a macro function. Additionally, the processor 22 may acquire finger-matching biometric data from more than one finger and a respective finger not only for authentication, but to perform finger-specific actions, for example. Further details of starting one or more applications are provided in U.S. Pat. No. 7,697,729 to Howell et al., assigned to the present assignee, and the entire contents of which are herein incorporated by reference.

The processor 22 authenticating the user based upon the most recently acquired finger-matching biometric data for the threshold time period may be particularly advantageous, for example, for reducing the amount of times a user is to be authenticated. More particularly, the amount of times a user would have to position the user's finger on the finger sensor 30 may be reduced to thus improve the user's overall experience. This may be particularly convenient for a user who uses applications that require authentication throughout use.

As will be appreciated by those skilled in the art, in a secure environment, for example, many applications or components thereof may desire assurances that a user has been authenticated to hold certain rights or be granted access to certain information. Often these applications or components cannot convey rights which have previously been granted, thus, as a result, requiring a re-authentication of the user immediately after a successful authentication. The present embodiments advantageously reduce an amount of "re-authentications." Faster access to applications that authenticate may also be provided.

If, for example, the threshold time period has expired, when an application requests an authentication, the processor 22 prompts the user to again position the user's finger 40 on the finger sensor 30 for acquisition of the finger-matching biometric data (Block 82). As noted above, the threshold time period may be set to thirty seconds, for example. The threshold time period may be set based upon a desired level of security. For example, if a higher level of security is desired for a given application, the threshold time period may be set to ten seconds, or even zero. The processor 22 matches the newly acquired finger-matching biometric data similarly as noted above (Block 80) since the newly acquired finger-matching biometric data is now the most recently acquired finger-matching biometric data. The authentication method ends at Block 84.

It should be understood that while the embodiments described may be particularly useful for both enrollment and matching operations, the matching operations may be performed independently of the enrollment operations, and vice versa. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
a finger-operated input device;
a finger sensor carried by said finger-operated input device to sense a user's finger; and
a processor to
perform a plurality of applications,
perform at least one menu function responsive to an operation of said finger-operated input device,
acquire finger-enrollment biometric data of the user's finger response to each of a plurality of operations of said finger sensor without prompting the user for the finger-enrollment biometric data,
when a threshold amount of finger-enrollment biometric data has been acquired, acquire finger-matching biometric data of the user's finger responsive to each of a plurality of subsequent operations of said finger sensor without prompting the user for the finger-matching biometric data, and
authenticate the user based upon an authentication request from one of the plurality of applications, the authentication being based upon a match of most recently acquired finger-matching biometric data and finger-enrollment biometric data for a fixed threshold time period after the most recent acquisition of the finger-matching biometric data, the fixed threshold time period being fixed across the plurality of applications.

2. The electronic device of claim 1, further comprising a display; and wherein said processor is to prompt, via said display, the user to again position the user's finger on said finger-operated input device after expiration of the fixed threshold time period.

3. The electronic device of claim 1, wherein the fixed threshold time period is less than or equal to 30 seconds.

4. The electronic device of claim 1, wherein said processor is to acquire finger-matching biometric data of a plurality of fingers.

5. The electronic device of claim 1, wherein said finger-operated input device comprises a pushbutton switch.

6. The electronic device of claim 1, further comprising wireless communications circuitry coupled to said processor and to perform at least one wireless communications function.

7. The electronic device of claim 1, further comprising a portable housing carrying said input device, said finger sensor, and said processor.

8. An electronic device comprising:
a portable housing;
a pushbutton switch carried by said portable housing;
a finger sensor carried by said pushbutton switch to sense a user's finger; and
a processor to
perform a plurality of applications,
perform at least one menu function responsive to an operation of said pushbutton switch,
acquire finger-enrollment biometric data of the user's finger response to each of a plurality of operations of said finger sensor without prompting the user for the finger-enrollment biometric data,
when a threshold amount of finger-enrollment biometric data has been acquired, acquire finger-matching biometric data of the user's finger responsive to each of a plurality of subsequent operations of said finger sensor without prompting the user for the finger-matching biometric data, and
authenticate the user based upon an authentication request from one of the plurality of applications, the authentication being based upon a match of most recently acquired finger-matching biometric data and finger-enrollment biometric data for a fixed threshold time period after the most recent acquisition of the finger-matching biometric data, the fixed threshold time period being fixed across the plurality of applications.

9. The electronic device of claim 8, further comprising a display carried by said portable housing; and wherein said processor is to prompt, via said display, the user to again position the user's finger on said pushbutton switch after expiration of the fixed threshold time period.

10. The electronic device of claim 8, wherein the fixed threshold time period is less than or equal to 30 seconds.

11. The electronic device of claim 8, wherein said processor is to acquire finger-matching biometric data of a plurality of fingers.

12. The electronic device of claim 8, further comprising wireless communications circuitry coupled to said processor and to perform at least one wireless communications function.

13. A method of authenticating a user of an electronic device comprising a finger-operated input device, a finger sensor carried by the finger-operated input device to sense a user's finger, and a processor coupled to the finger sensor, the method comprising:
using the processor to
perform a plurality of applications,
perform at least one menu function responsive to an operation of the finger-operated input device,
acquire finger-enrollment biometric data of the user's finger response to each of a plurality of operations of said finger sensor without prompting the user for the finger-enrollment biometric data,
when a threshold amount of finger-enrollment biometric data has been acquired, acquire finger-matching biometric data of the user's finger responsive to each of a plurality of subsequent operations of the finger-operated input device without prompting the user for the finger-matching biometric data, and
authenticate the user based upon an authentication request from one of the plurality of applications, the authentication being based upon a match of most recently acquired finger-matching biometric data and finger-enrollment biometric data for a fixed threshold time period after the most recent acquisition of the finger-matching biometric data, the fixed threshold time period being fixed across the plurality of applications.

14. The method of claim 13, wherein using the processor further comprises using the processor to prompt, via a display, the user to again position the user's finger on the finger-operated input device after expiration of the fixed threshold time period.

15. The method of claim 13, wherein the fixed threshold time period is less than or equal to 30 seconds.

16. The method of claim 13, wherein using the processor comprises using the processor to acquire finger-matching biometric data of a plurality of fingers.

17. The method of claim 13, wherein the finger-operated input device comprises a pushbutton switch.

* * * * *